Figure 1:
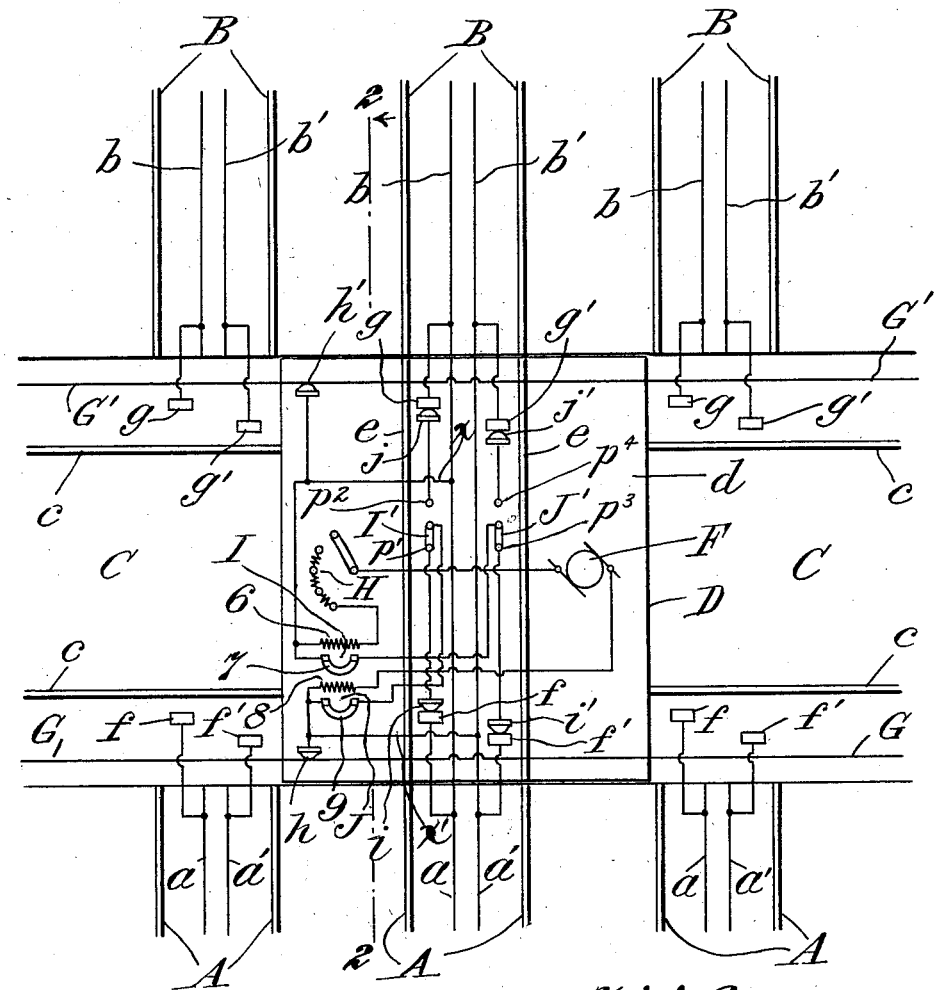

T. F. MULLANEY.
ELECTRICAL SYSTEM FOR TRANSFERRING CARS.
APPLICATION FILED FEB. 26, 1909.

1,097,136.

Patented May 19, 1914.

2 SHEETS—SHEET 1.

WITNESSES
A. C. Abbott
M. C. Powell

INVENTOR
Thomas F. Mullaney
BY Griffin & Bernhard
ATTORNEYS

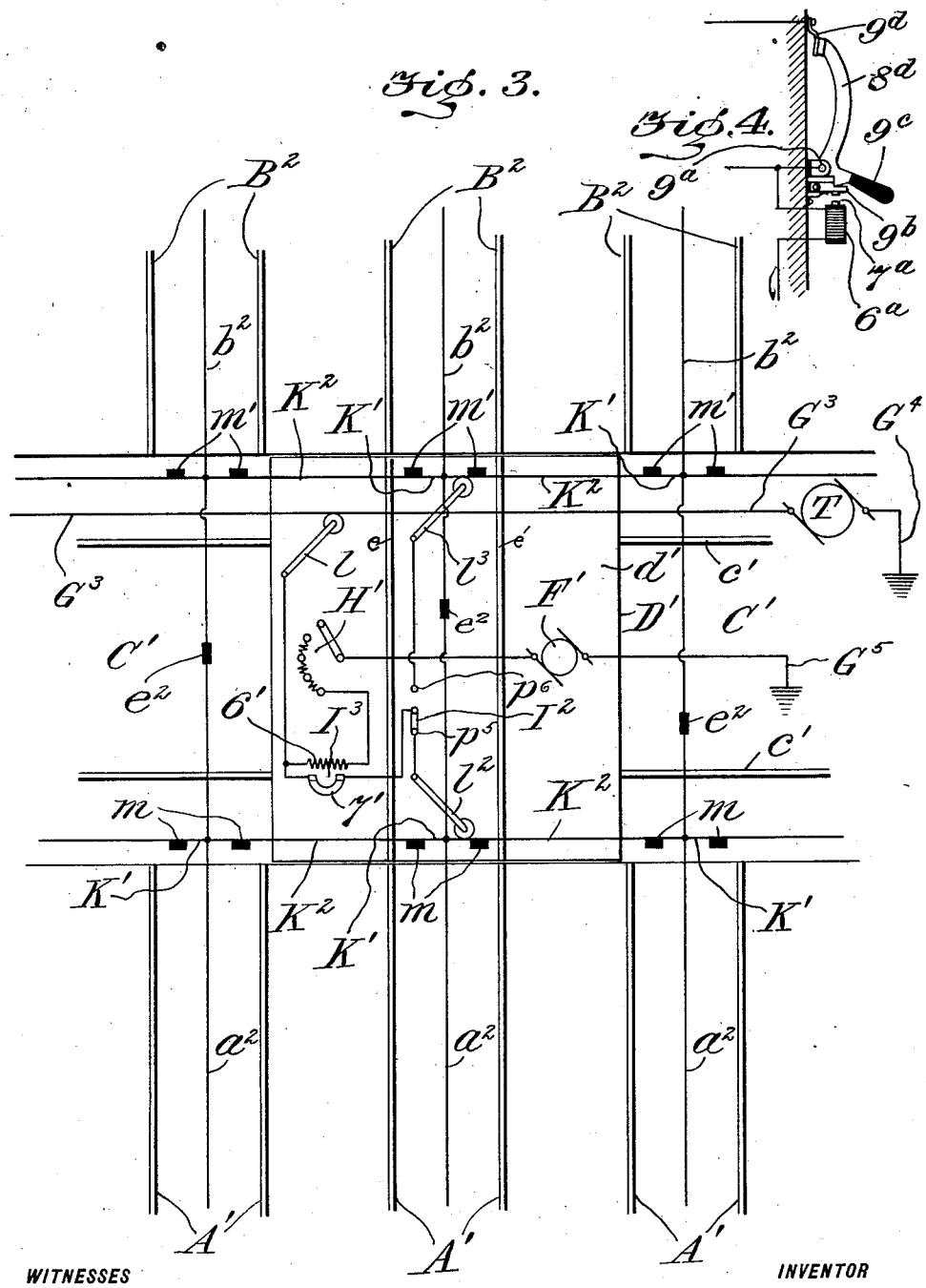

UNITED STATES PATENT OFFICE.

THOMAS F. MULLANEY, OF NEW YORK, N. Y.

ELECTRICAL SYSTEM FOR TRANSFERRING CARS.

1,097,136.   Specification of Letters Patent.   Patented May 19, 1914.

Application filed February 26, 1909. Serial No. 480,222.

*To all whom it may concern:*

Be it known that I, THOMAS F. MULLANEY, a citizen of the United States, residing in the city of New York, borough of Manhattan, county and State of New York, have invented a certain new and useful Electrical System for Transferring Cars, of which the following is a specification.

This invention is an electrical system for controlling power circuits in buildings where electrically propelled cars are stored, and wherein it is desired to transfer or shift said cars from their in-coming tracks to storage tracks, or to move them from one place to another in a car barn.

It is a common expedient in car barns to install a series of parallel in-coming tracks leading to a " car pit," in the bottom of which is located a track, at right angles to the in-coming tracks, and on which a " transfer " or pit car is operated. The platform of the transfer car is provided with a track, positioned at right angles to the track on which said car travels, and occupying the same plane as the in-coming tracks. A series of storage tracks leads from that side of the car pit opposite the in-coming tracks, and occupy the same plane thereof, so that an in-coming car may be loaded on to the platform of the transfer car, the latter then moved so that its platform track is brought into alinement with one of the storage tracks, and the car loaded thereon then delivered to said storage track. In the foregoing system of transfer, however, both the in-coming and storage tracks are at all times "live" tracks, and, as a result, conflagrations frequently occur in the cars, not to speak of other accidents, owing to poorly insulated or otherwise defective circuits. For the specified reasons, among others, underwriters have placed high rates of insurance on buildings equipped with systems of the character described, and, in some instances, have practically declined to assume insurance risks thereon. Experience shows, moreover, that when tracks are allowed to remain charged, careless attendants neglect to turn out the lights in the cars, and, in this way, a very considerable useless expense is entailed.

The present invention is designed to overcome the several disadvantages adverted to, among others, and in one phase may be said to consist in the provision of means whereby any one of the in-coming or storage tracks, though all of them are normally "dead," may be charged by completing a circuit through the transfer car, when the track on the platform of the latter is in alinement with the particular track which it is desired to charge, said latter track again becoming dead upon movement of the transfer car.

In the hereinafter detailed description of the invention it will be apparent that many features of the system are applicable to car barns not employing a transfer pit, or turn table, and wherein the cars are run in and stored on a series of parallel tracks.

In the preferred form of the invention, the circuits are so arranged that when the transfer car is positioned so as to receive or discharge a car, the in-coming or storage track, as the case may be, is energized by the operation of a circuit breaker on said transfer car, the circuit through the motor on the transfer car being necessarily broken. Vice versa, when the circuit breaker on the motor car is operated so as to deënergize the track, the controller of the transfer car motor may be operated so as to energize said motor. In each instance, the opening of the controller which energizes the transfer car motor, automatically opens a circuit whereby the track is deënergized, and, when the controller is operated so as to deënergize the motor, a circuit is automatically closed whereby the track is energized. It will thus be apparent, in this form of the invention, that when a given receiving or storage track is energized, the motor on the transfer car is dead, and, on the other hand, when said motor is energized, the track is dead. In certain embodiments of the invention, however, mechanism is employed whereby more than one of the tracks, in fact any number thereof desired, may be rendered live for the purpose of manipulating cars thereon. Moreover, as an adjunct to the invention, I may employ a time switch, thereby enabling me to keep one or more of the tracks charged for a predetermined length of time only.

Various functions and advantages of the invention, other than those enumerated, will appear from the hereinafter detailed description thereof.

In the accompanying drawings I have illustrated different practical embodiments of the invention, but the constructions shown therein are to be understood as illustrative, only, and not as defining the limits of the invention.

Figure 2:
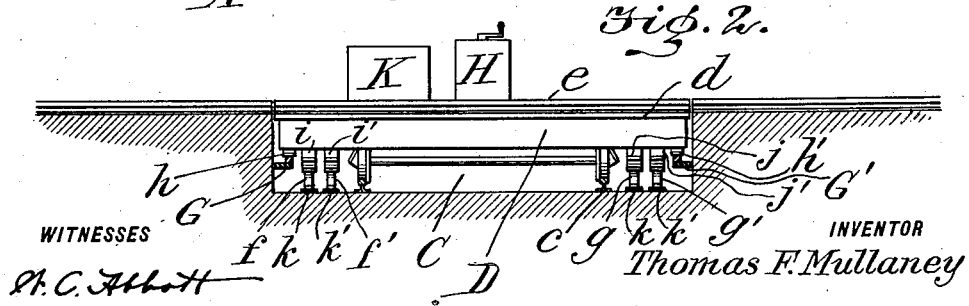

Figure 1 shows the invention, in diagram, as applied to a metallic underground system. Fig. 2 is a cross section on line 2—2 of Fig. 1 showing the car pit, platform car and its connections. Fig. 3 shows the invention as applied to an overhead trolley with a grounded system, illustrating, also, the manner in which a double trolley circuit would be controlled. Fig. 4 shows a manually operated circuit breaker of the type preferably used on the transfer car.

Referring particularly to Figs. 1 and 2, A represents the series of in-coming tracks, $a$, $a'$, the conductor rails therefor, and B, the series of storage tracks having the conductor rails, $b$, $b'$.

C designates the transfer pit, in which are positioned tram rails, $c$, $c$, on which the transfer pit car, D, provided with platform, $d$, rides. Mounted on platform, $d$, are the rails, $e$, $e$, in the same plane, and adapted to be placed in alinement with the tram rails of any one of the in-coming or storage tracks. It is to be understood that the conductor rails of the transfer car are not in contact with the rails of the incoming tracks. Each pair of conductor rails of the in-coming tracks is provided with contact plates, $f$, $f'$, and each pair of conductor rails of the storage tracks are likewise provided with corresponding contact plates, $g$, $g'$. F represents the motor of the transfer car, D, and it is adapted to be energized from the conductor mains, G, G', through the spring-contact shoes or brushes, $h$, $h'$. The transfer car is provided with a rheostat or controller H, for the motor, and two (2) circuit breakers, I and J, both of which may be connected in circuit with motor, F. The circuit breakers are housed within a casing, K, (see Fig. 2). The coil of the circuit breaker, I, is designated by 6 and the movable member by 7, and the coil of circuit breaker, J, is designated by 8, and its movable member by 9. The path of the motor current, through the connections described, is as follows: It passes from main, G, through brush, $h$, and coil 8 of circuit breaker, J, which is in open position, to motor, F; thence through controller, H, coil 6 of circuit breaker, I, which is also in open position, through brush, $h'$, to the other main, G'. It is thus apparent that when the motor on the transfer car is energized, the in-coming tracks, A, and storage tracks, B, are dead.

I will now describe the means whereby any one of the in-coming tracks may be energized. The transfer car is provided with two switches, I', J', the former adapted for connection with either contact, $p'$ or $p^2$, and the latter with either contact, $p^3$ or $p^4$. As shown, switch, I', connects with contact, $p'$, and switch, J', with contact, $p^3$. Through switch, I', a circuit is established to conductor main, G, through the movable member 9 of circuit breaker, J, and brush, $h$, and with conductor rail, $a$, through brush, $i$, and contact, $f$. Through switch, J', a circuit is established to conductor main, G', through the movable member 7 of circuit breaker, I, and contact, $h'$, and with conductor rail, $a'$, through brush, $i'$, and contact, $f'$. By means of the connections described, it will be apparent when the circuit breakers, I and J, are in their closed positions and the controller, H, is in the "off" position (thereby precluding a current from passing through the coils of breakers, I and J) that track, A, may be energized by closing switches, I', and J', into the positions just described, whereby a circuit is completed from main, G, through brush, $h$, movable member 9 of circuit breaker, J, switch, I', brush, $i$, and contact, $f$, to conductor rail, $a$, thence through motor on an in-coming car to conductor rail, $a'$, contact, $f'$, brush, $i'$, switch, J', movable member 7 of circuit breaker, I, and brush, $h'$, to other conductor main, G'. When track, A, is energized as described, it will be observed that transfer car, D, must be positioned with its tram rails, $e$, $e$, in alinement with the tram rails of track, A, and it will be observed, also, that the motor F, on the transfer car is dead, because of the fact that controller, H, is in "off" position. By throwing switch, I', so that it breaks contact with $p'$ and makes contact with $p^2$, and throwing switch, J', so that it breaks contact with $p^3$ and makes contact with $p^4$, storage track, B, may be energized in the same manner as described in connection with track, A, through the corresponding brushes and contacts on track, B. Thus when switches, I', and J', contact with $p^2$ and $p^4$, respectively, the circuit whereby track, B, is energized is as follows: From conductor main, G, to brush, $h$, movable member 9 of circuit breaker, J, switch, I', contact, $p^2$, brush, $j$, contact, $g$, to conductor rail, $b$; thence through motor on storage car to conductor rail, $b'$, contact, $g'$, brush, $j'$, contact $p^4$, switch, J', movable member 7 of circuit breaker, I, and brush, $h'$, to other conductor main, G'.

From the foregoing description of the several circuits, and the manner of making and breaking them, the operation of energizing an in-coming track, running a car therefrom on to the transfer car, then running the latter to the desired storage track, and running the car to be stored thereon from the transfer car, will be readily understood; but it may be summarized briefly as follows: The motor on the transfer car is put in operation and said car is moved to the desired position with reference to one of the in-coming tracks. The motor is then shut off by operating controller, H, thereby simultaneously deënergizing coils 6 and 8 of the circuit breakers, I and J, respectively, whereupon said circuit breakers are closed manually by advancing their respective movable members into locked position. Switches, I' and J', are then thrown into the positions to connect with contacts, $p'$ and $p^3$, respectively, as shown in Fig. 1. The current is now shunted, as heretofore described, through the movable members of circuit breakers, I and J, and the track, A, energized as previously detailed. The incoming car is then moved on to the transfer car, the latter being provided with conductor rails adapted to be placed in alinement with the conductor rails of either the in-coming or storage tracks, whereby the motor of the car to be transferred may be energized after leaving its in-coming track. The motor of the transfer car D is energized through the spring contact shoes or brushes $h$, $h'$ from the conductor mains G, G'. The conductor rails of the transfer car are energized through the connections $x$ $x'$ as clearly shown in Fig. 1 on the transfer car without energizing the motor. The car to be transferred having been loaded on to the transfer car, the motor of the latter is thrown in circuit by means of controller H, whereupon transfer car is run into position with reference to the desired storage track. As previously pointed out, when the motor on the transfer car is energized, the current simultaneously passes through the coils of circuit breakers, I and J, and automatically opens them, thereby deënergizing track, A. The transfer car, loaded with the car to be transferred, having been run to the desired storage track, the latter is energized, as previously described, and the car to be transferred is run thereon. It will be understood that the reverse operation of transferring a car from a storage track to an out-going track, or the operation of transferring a car from one storage track to another, may be readily effected.

Referring now particularly to Fig. 3, which shows the system as applied to an overhead trolley, with ground return, and, which it is obvious, would be alike applicable to a double trolley circuit, A', represents the series of in-coming tracks, each equipped with overhead trolley wire, $a^2$, and B² the series of storage tracks, each equipped with overhead trolley wire, $b^2$. T is the generator at the power house or central station, in circuit with the overhead main, G³, and return grounded main, G⁴. C' is the transfer pit, $d'$, the platform of pit car, D', $c'$, $c'$ the rails on which the pit car travels, and $e'$, $e'$ the rails on the platform, all the same as hereinbefore described in connection with Figs. 1 and 2. The motor, F', of the pit car is connected with the controller, H', coil 6' of circuit breaker, I³, the movable member of which is 7', through trolley pole and wheel, $l$, conductors G³, generator T, conductor G⁴ and then through ground connection, G⁵, back to motor, F'. These connections constitute the motor circuit of the pit car. On either side of the transfer pit, C', are the feeder sections, K', K², for energizing the local overhead trolley wires, $a^2$ and $b^2$, respectively. Sections, K', K², respectively, are insulated, as shown, by means of the insulation members, $m$ and $m'$, respectively, from the wires intervening between each series of said sections. I² is a switch adapted to make connection with either contact, $p^5$ or $p^6$. When the motor on the transfer car is energized through the connections described, the circuit breaker, I³, is open and the incoming tracks, A', and storage tracks, B², are dead. Assuming now that the transfer car is in alinement with one of the in-coming tracks, which it is desired to energize, the operation is as follows: The current being off the motor i. e., controller, H', being in its inoperative position, the circuit breaker, I³, is closed and switch, I², positioned so as to make connection with contact, $p^5$. A circuit is then established from conductor main, G³, through trolley wheel and pole, $l$, movable member, 7' of circuit breaker, I³, switch, I², contact, $p^5$, trolley pole and wheel, $l^2$, to one of the sections, to which $a^2$ is connected. The local trolley wire, $a^2$, is thus energized, whereupon an incoming car may be loaded on the transfer car. The transfer car having been run to the desired storage track, the latter may then be energized in the same manner, as just described in connection with the incoming track, by throwing switch, I², so as to make contact with $p^6$, thereby completing the circuit through trolley wheel and pole, $l^3$, to local trolley $b^2$. Members, $e^2$, insulate trolley wires $a^2$ and $b^2$ from each other, thereby precluding both trolley wires from being charged at the same time.

The practical operation of energizing one of the tracks, A', loading an incoming car on the platform, $d'$, of the pit car and then transferring it to one of the storage tracks, B², is the same, to all intents and purposes, as has been fully described in connection with the system illustrated in Figs. 1 and 2.

I have illustrated in Fig. 4 one of the circuit breakers, shown diagrammatically in Fig. 1, and wherein 6ª is the coil of the solenoid and 7ª the core. 8ᵈ is the movable member of the switch, the same being pivoted at 9ª, and held in its closed position by means of a spring pressed latch, 9ᵇ. 9ᶜ is the handle and 9ᵈ the spring contact through which the circuit is completed. When the coil is not energized, the circuit breaker is closed, the circuit being established through $8^d$ and $9^d$, but when coil $6^a$ is energized, the spring pressed latch $9^b$ is retracted, thereby allowing $8^d$ to drop backward and break the circuit at $9^d$. When the coil is again deenergized, the movable member $8^d$ is closed manually, by means of handle $9^c$, as heretofore described.

It will be obvious that various changes in the system as described, as well as in different applications thereof, may be made without departing from the spirit of the invention, so long as they come within the scope of the appended claims.

Having thus fully described the invention, what I claim as new, and desire to secure by Letters Patent is:

1. In a system of the class described, a series of incoming tracks, a series of storage tracks, a transfer car coöperating with both series of tracks, said incoming and storage tracks having conductor rails, electrical connections from a source of energy to the conductor rails of any track, normally out of circuit, and means for completing said connections whereby any of said conductor rails may be charged by completing a circuit through the transfer car when the car is in proper position.

2. In a system of the class described, a series of incoming tracks, a series of storage tracks, a transfer car coöperating with both series of tracks, said incoming and storage tracks having conductor rails, electrical connections from a source of energy to the conductor rails of any track, normally out of circuit, and means for completing said connections whereby any of said conductor rails may be charged by completing a circuit through the transfer car and said rail deënergized upon movement of the transfer car.

3. In a system of the class described, a series of incoming tracks having conductor rails, electrical connections from a source of energy to the conductor rails of any track normally out of circuit, a transfer car coöperating therewith, and electrical connections on the transfer car whereby the conductor rails of any track may be energized through the electrical connections on said car when the car is in proper position.

4. In a system of the class described, a series of incoming tracks having conductor rails, a series of storage tracks with conductor rails therefor, electrical connections from a source of energy to the conductor rails of any track whereby they may be energized and both of which series of conductor rails are normally deënergized, a transfer car carrying a portion of said connections and coöperating with both series of tracks, a motor on the transfer car, and means for closing said connections and thereby energizing the conductor rails of any one of said tracks without energizing the motor, and vice versa.

5. In a system of the class described, a series of tracks having conductor rails, and which rails are normally deënergized, and a transfer car having conductor rails, a source of energy and connections therefrom and means for completing the connections whereby the conductor rails of any track may be charged by completing the circuit.

6. In a system of the class described, a series of incoming tracks, conductor rails therefor, a series of storage tracks, conductor rails therefor, connections from a source of energy, normally out of circuit, a transfer car coöperating with both series of tracks and having conductor rails and means for completing the connections to energize any of the incoming tracks or the storage tracks.

7. In a system of the class described, a series of incoming tracks having conductor rails, a series of storage tracks having conductor rails, electrical connections from a source of energy, normally out of circuit, a transfer car coöperating with both series of tracks and means for completing the connections to energize any of said conductor rails, including means on the transfer car for establishing a circuit through the latter.

8. In a system of the class described, a series of incoming tracks having conductor rails, a series of storage tracks having conductor rails, electrical connections normally out of circuit from a source of energy, a transfer car coöperating with both series of tracks and means for establishing a circuit through the transfer car to energize the conductor rails of any one of the incoming tracks or the conductor rails of any one of the storage tracks.

9. A plurality of incoming tracks, a plurality of storage tracks, a source of energy, a main electric circuit from the source of energy, conductor rails for each of the incoming and storage tracks, said conductor rails being normally out of circuit with the main circuit, a transfer car provided with an electric motor, and means whereby the motor may be energized from the main circuit without energizing the conductor rails, and vice versa.

10. In a system of the class described, a series of tracks having conductor rails, a transfer car, a motor thereon, conductor rails and connections on said car, electrical connections adapted to be placed in circuit with the conductor rails of any one of said tracks through the connections on the car and means coöperating with said electrical connections for electrically energizing the conductor rails of any one of said tracks at will without energizing the car motor.

11. In a system of the class described, a plurality of tracks provided with conducting means, a transfer car provided with a motor, and means whereby the conducting means of any one only of said tracks or the motor may be energized but not both at the same time.

12. In a system of the class described, a plurality of tracks having conducting means and electrical connections normally out of circuit, a transfer car provided with electrical connections adapted to be placed in circuit with the conducting means of any one of the tracks, said electrical connections embodying means for energizing any one of said tracks at will.

13. In a system of the class described, a plurality of in-coming tracks having conducting means, a plurality of storage tracks having conducting means, a car pit intermediate the in-coming and storage tracks, a transfer car in said pit coöperating with the tracks, and means on the car whereby the conducting means of any one only of said tracks may be electrically energized or deenergized.

14. In a system of the class described, a plurality of incoming tracks, a plurality of storage tracks, a car pit intermediate said incoming and storage tracks, a transfer car in said pit coöperating with said tracks, a source of electrical energy, and means on said car for connecting said source of energy with, or disconnecting it from, any one of the rails at will.

In testimony whereof I have signed my name to this specification in the presence of two subscribing witnesses.

THOMAS F. MULLANEY.

Witnesses:
JAS. H. GRIFFIN,
WALTER J. QUINN.

---

Copies of this patent may be obtained for five cents each, by addressing the "Commissioner of Patents, Washington, D. C."